United States Patent
Beale

(10) Patent No.: US 10,439,971 B1
(45) Date of Patent: Oct. 8, 2019

(54) SYSTEM FOR DETECTING ERRONEOUS COMMUNICATIONS

(71) Applicant: AMAZON TECHNOLOGIES, INC., Seattle, WA (US)

(72) Inventor: Justin A Beale, Saint Clair Shores, MI (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/823,315

(22) Filed: Nov. 27, 2017

(51) Int. Cl.
| | |
|---|---|
| G06K 9/00 | (2006.01) |
| H04L 12/58 | (2006.01) |
| G06K 9/62 | (2006.01) |
| G06F 17/21 | (2006.01) |
| G06N 3/02 | (2006.01) |

(52) U.S. Cl.
CPC ............ *H04L 51/12* (2013.01); *G06F 17/212* (2013.01); *G06K 9/00449* (2013.01); *G06K 9/00463* (2013.01); *G06K 9/6202* (2013.01); *G06K 2209/01* (2013.01); *G06N 3/02* (2013.01)

(58) Field of Classification Search
CPC ... H04L 51/12; G06F 17/212; G06K 9/00449; G06K 9/00463; G06K 9/6202; G06K 2209/01; G06N 3/02
USPC .......................... 715/234, 235, 243, 248, 250
See application file for complete search history.

(56) References Cited

U.S. PATENT DOCUMENTS

| | | | | |
|---|---|---|---|---|
| 7,017,492 | B2 * | 3/2006 | Seymour | B41F 33/0036 101/183 |
| 7,092,552 | B2 * | 8/2006 | Harrington | G06F 17/211 382/112 |
| 8,212,834 | B2 * | 7/2012 | Bogart | G06T 11/60 345/501 |
| 8,766,940 | B1 | 7/2014 | Starner et al. | |
| 9,482,882 | B1 | 11/2016 | Hanover et al. | |
| 2006/0155699 | A1 * | 7/2006 | Purvis | G06F 17/248 |
| 2006/0248071 | A1 * | 11/2006 | Campbell | G06F 17/211 |
| 2007/0288878 | A1 * | 12/2007 | Tai | G06F 17/5077 716/126 |
| 2008/0235261 | A1 * | 9/2008 | Malek | G06F 17/3089 |
| 2009/0161916 | A1 * | 6/2009 | Ma | G06K 9/00442 382/112 |
| 2009/0204889 | A1 * | 8/2009 | Mehta | G06F 17/30 715/246 |
| 2009/0228328 | A1 * | 9/2009 | Cagan | G06F 17/5095 705/7.29 |
| 2012/0269434 | A1 * | 10/2012 | Atkins | B42D 1/08 382/175 |

(Continued)

*Primary Examiner* — Andrew R Dyer
(74) *Attorney, Agent, or Firm* — Lindauer Law, PLLC

(57) ABSTRACT

Techniques for detecting errors in communications include generating a communication based on a received payload and an existing template that corresponds to the payload. An image file indicative of the visual appearance of the communication is generated. The visual appearance of the communication is compared to that of a model, which indicates an expected location, color, or shape associated with particular elements of the communication. If the visual appearance deviates from that of the model by at least a threshold tolerance, a notification indicative of a potential error in the payload or template may be generated. If the visual appearance significantly deviates from that of the model, transmission of the communication may be prevented.

20 Claims, 6 Drawing Sheets

(56) References Cited

U.S. PATENT DOCUMENTS

| | | | |
|---|---|---|---|
| 2013/0145257 A1* | 6/2013 | Shalabi | G06F 17/248 |
| | | | 715/243 |
| 2013/0185630 A1* | 7/2013 | Ahmadullin | G06Q 50/00 |
| | | | 715/243 |
| 2013/0205199 A1* | 8/2013 | Damera-Venkata | ......................... |
| | | | G06F 17/248 |
| | | | 715/243 |
| 2013/0212471 A1* | 8/2013 | Damera-Venkata | ......................... |
| | | | G06F 17/211 |
| | | | 715/243 |
| 2017/0132251 A1* | 5/2017 | Qiu | G06F 17/30256 |
| 2018/0115746 A1* | 4/2018 | Wang | G06F 3/0481 |

* cited by examiner

SYSTEM FOR DETECTING ERRONEOUS COMMUNICATIONS

BACKGROUND

Notification systems may be used to generate and transmit a large number of communications via one or more media, such as e-mail, Short Message Service (SMS), and so forth, by inserting a user-provided payload into a template. Due to the large number of communications that may be sent, an error in a template or payload that affects the appearance of one or more of the communications may be undetected.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
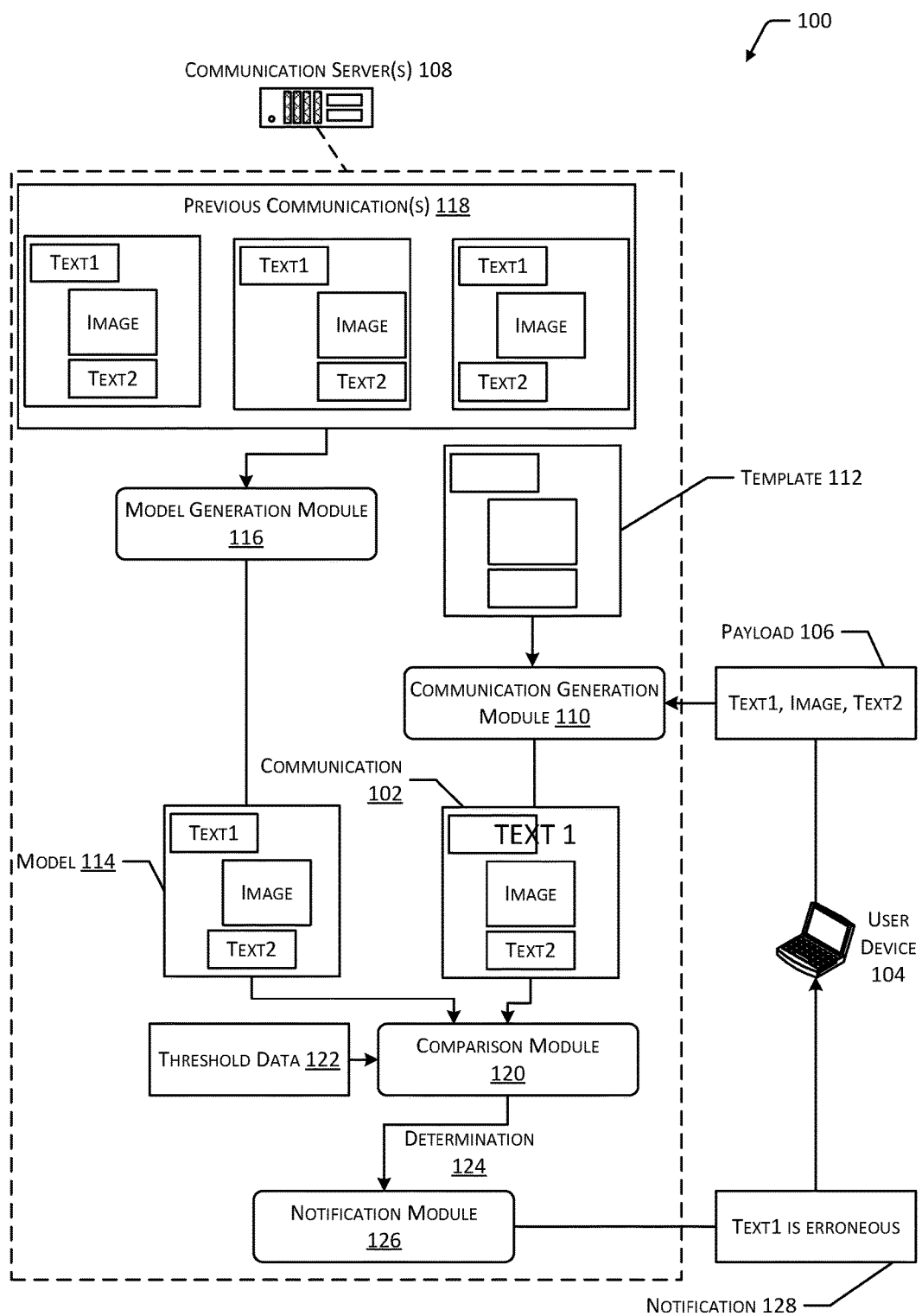
FIG. 1 depicts an implementation of a system for determining potential errors in communications.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

E-mail, Short Message Service (SMS) messages, and other types of push notification systems may be used to provide communications or other types of data to receiving users. For example, a user may use a push notification system to provide a communication to multiple recipients by providing payload data to be inserted into a template. Payload data may include contents of the communication, such as alphanumeric data, image data, audio data, and so forth. A template may include a layout for presenting the payload data and one or more other elements to receiving users. For example, a template may include one or more regions, each of which is used to output a particular portion of the payload data. Additionally, a template may include other visible elements, such as borders, separator lines, headers, footers, and text or images that may be common to multiple communications independent of the payload, such as a logo or signature. As a specific example, a template may include a header that presents a company logo, a footer that presents a textual disclaimer, two regions for presenting text that are separated by a separator line, and one region for presenting an image. The payload data may include two sets of alphanumeric data and image data corresponding to an image. Generation of a communication may include inserting each set of alphanumeric data into a respective region of the template for presenting text, and inserting the image in the region of the template for presenting images. The resulting communication may include the portions of the payload data positioned within the corresponding regions of the template, as well as the separator line, header, footer, and other visible elements contained in the template.

Use of templates to generate communications may enable a user to provide a single payload that may be used to generate a large number of communications. In some cases, multiple templates may be used to generate communications based on the same received payload data. For example, due to formatting differences in various media, a first template may be used to generate communications to be sent via e-mail, while a second template may be used to generate communications to be sent via SMS. As another example, a first template may be used to generate communications to be sent to a first country where a first language is predominately used while a second template may be used to generate communications to be sent to a second country where a different language is predominantly used.

In some cases, one or more generated communications may include at least one visual error, and due to the large number of communications that may be generated and transmitted using a single payload, the erroneous communication(s) may be undetected. For example, a user may modify a template to change the visual presentation of a communication and may inadvertently create an error in the template that may cause a portion of the payload data to be presented in a manner that is not understandable, not aesthetic, or that interferes with the placement and comprehension of other elements in the communication. As another example, a template may include one or more conditional elements that are only used if the payload data meets or fails to meet certain conditions, and a visual error may only occur in a portion of the communications where such a conditional element is invoked. Detection of errors by individually reviewing each communication may not be possible if a large number of communications are sent.

Described in this disclosure are techniques for the automated analysis of at least a portion of a set of generated communications. Over time, a template may be used to generate multiple communications. At least a portion of these historical communications may be used to generate a model indicative of an expected visual appearance of communications that utilize the template. Specifically, historic communications that use a particular template may be rendered to generate image files, each of which is indicative of the visual appearance of an individual communication. The historic communications may be rendered without outputting the image files to a display or other output device. Image analysis techniques, such as computer vision algorithms, may be used to determine the location of particular types of content within the visual appearances, such as the location of text, images, separator lines, borders, and other visible elements. In some cases, image analysis techniques may include use of machine learning, neural networks, convolutional neural networks, and so forth. In some implementations, use of the visual appearance of a communication to determine the presence of errors may be performed independent of any languages associated with the communication. In other implementations, image analysis may also include use of optical character recognition (OCR) or other types of text recognition to determine that alphanumeric data corresponds to a particular language or alphabet. For example, OCR may be used to determine that a region of a communication includes English text rather than HTML code that was presented as text in the template due to an error in the template or payload. As another example, OCR or another text recognition technique may be used to identify text that corresponds to HTML code or other text that would be erroneous if output. Continuing the example, if the text "/bold" is identified in a communication, this may indicate that at least a portion of the underlying code for the communication template has been improperly presented as text.

A model that includes expected locations for one or more types of data may be generated based on the historic communications. For example, coordinates (e.g., X and Y coordinates indicative of horizontal and vertical position) or other types of indicators may be determined for the locations of one or more features of each visual appearance. Continuing the example, coordinates corresponding to the placement of an image or separator line, coordinates corresponding to the edges of an image or block of text, coordinates corresponding to other boundaries for content, and so forth may be determined. Based on the coordinates for a particular type of data, visual element, or boundary, an expected location for that content may be determined. For example, an expected location may include an average location (e.g., a mean, mode, or median location) based on each historic communication. As another example, one or more historic communications may be weighted more heavily than other historic communications and may more strongly influence the determined expected location of a feature. For example, more recent communications may be provided with a greater weight than older communications. The resulting model may include expected locations for one or multiple types of content. As additional communications are generated, each communication may be used to modify the model. In some implementations, one or more machine learning algorithms may be used to analyze the locations of content within historic communications and determine the location for each type of content within the model. In other implementations, a model may not necessarily include explicitly determined locations of content but may instead be represented by one or more weights or other parameters associated with a trained neural network.

When subsequent payload data is received, the template that corresponds to the payload and the destination may be determined. Different templates may correspond to different types of payload data, different languages used in the payload, different applications used to present the payload, and so forth. For example, a first template may be used to present a payload in English while a second template is used to present a payload in Arabic. As another example, a first template may be used to present a payload that is transmitted using e-mail while a second template is used to present a payload that is transmitted using SMS. A communication may be generated that includes at least a portion of the payload data in one or more regions of the determined template. The communication may be rendered to produce an image file indicative of the visual appearance of the communication. Rendering of the communication to produce the image file may be performed without necessarily outputting the communication to a display device. The model that corresponds to the template that is used may be determined. The visual appearance of the communication may be compared to the visual appearance of the model to determine one or more differences in the location of particular types of content or other visible elements. For example, the location of a portion of the payload data and the location of corresponding content within the model may be compared to determine whether the two locations are within a threshold tolerance of one another. If the location of a particular element in the communication differs from the expected location indicated in the model by more than a first threshold value, this may indicate that the template or payload includes an error. A notification indicative of the error in the template or payload may be generated. If the location of the particular element differs from the expected location by a second threshold value greater than the first, transmission of the communication to a destination device may be prevented. In some implementations, the difference between the location of a portion of the payload data in a communication and a corresponding location in the model may be indicated based on a difference metric, such as a qualitative or quantitative value, which may be compared to a threshold value to determine the potential presence or absence of an error in the communication.

In some implementations in response to a notification or prevention of transmission of a communication, user input indicating approval of the communication may be received. In response to the user input, the communication may be transmitted to the destination device and the model may be modified based on the communication. For example, if the location of a portion of the payload data in the communication deviates from a corresponding location in the model by at least a threshold tolerance, the location in the model may be modified to be closer to that of the location in the communication approved by the user input.

In some implementations, a user modification to a template may cause a visible error in one or more communications. For example, a user may edit a template to change the manner in which a portion of a payload is displayed, but inadvertently modify the code associated with the template in a manner that causes the portion of the payload to appear in other areas of the template obstructing other content. In such a case, comparison of the model to a communication that is affected by the modified template may result in differences that exceed a threshold value, responsive to which a notification may be generated. In cases where one or more modifications to a template were previously received, the notification may indicate the modification(s) as a potential source of error.

In some implementations, a modification to a template may be received, and user input may indicate that the modification includes a major modification. For example, a user may modify a template in a manner that will cause the visual appearance of subsequent communications generated using the template to differ significantly from an existing model. However, the differing communications would not be erroneous based on the user modifications to the template. In such a case, a modified model may be generated based on one or more subsequent communications, and the modified model may replace the existing model.

FIG. 1 depicts an implementation of a system 100 for determining potential errors in communications 102. A communication 102 may include any combination of alphanumeric data, audio data, image data, video data, or other types of data that may be used to convey information to a recipient when output. For example, a communication 102 may include an e-mail, a SMS message, a push notification, a notification associated with an application or widget executing on a destination device, and so forth. To generate communications 102 to be provided to destination devices, a user device 104 may provide a payload 106 to one or more communication servers 108. The payload 106 may include any combination of alphanumeric data, image data, audio data, or video data. For example, a single payload 106 provided by a user device 104 may be used to generate multiple communications 102 for transmission to destination devices. In some implementations, the communications 102 may each be associated with a single medium, such as e-mail. In other implementations, the communications 102 may be associated with different media. For example, a first portion of the generated communications 102 may include SMS messages while a second portion of the communications may include e-mail. While FIG. 1 depicts a single communication server 108, the communication server(s) 108 may include any number and any type of computing device(s) including, without limitation, personal computers (e.g., desktop or laptop computers), portable computing devices (e.g., smartphones, notebooks, tablet computers, palm-top computers), wearable computing devices, automotive computing devices, gaming systems, smart televisions, set-top boxes, and so forth. Additionally, while FIG. 1 depicts a single user device 104, the user device 104 may include any number and any type of computing device(s) including, without limitation, the types of computing devices described with regard to the communication server(s) 108. Similarly, the destination devices to which the communications 102 are to be transmitted may include any number and type of computing devices including, without limitation, the types of computing devices described with regard to the communication server(s) 108 and the user device 104.

A communication generation module 110 associated with the communication server(s) 108 may determine one or more templates 112 that correspond to the received payload 106, the user device 104, or the destination devices associated with the communications 102. For example, a template 112 may be associated with a particular medium of communication, such as e-mail, while a different template 112 may be used when generating a SMS message. As another example, a first template 112 may be used when generating communications 102 for receipt by a first type of destination device, such as a cellular telephone, while a second template 112 is used when generating communications 102 for receipt by a different type of destination device, such as a desktop computer. Templates 112 may also be associated with particular types of payload 106 data. For example, a first template 112 may be used to generate communications 102 that include only alphanumeric data while a second template 112 is used to generate communications 102 that include image data. Templates 112 may additionally be associated with different languages, different locations associated with the user device 104 or destination device(s), and so forth.

A template 112 may include regions for containing particular types of payload data. For example, FIG. 1 depicts an example template 112 including two regions for containing text and a third region for containing an image. A template 112 may also include one or more elements that may be common to multiple communications 102, such as a header, a footer, borders, separator lines, and so forth. The communication generation module 110 may generate one or more communications 102 by associating portions of the received payload 106 with corresponding regions of the template 112.

In some cases, the visual appearance of a communication 102 may be affected by one or more errors. For example, due to an error associated with the template 112 or the payload 106, one or more portions of the payload 106 may extend outside of the corresponding region of the template 112. To determine the presence of potential errors in the communications 102, at least a subset of the communications 102 may be compared with a model 114 indicative of an acceptable visual appearance of a communication 102. If the visual appearance of the communication 102 differs from that of the model 114 by more than a threshold tolerance, this may indicate the presence of an error in the template 112 or payload 106.

A model generation module 116 associated with the communication server(s) 108 may generate the model 114 based on one or more previous communications 118 that were generated using the template 112. For example, the model generation module 116 may use one or more computer vision algorithms to determine the visual appearances associated with at least a subset of the previous communications 118 that used the template 112. Continuing the example, the model generation module 116 may determine the location of one or more types of payload 106 data, one or more visible elements associated with the template 112, the shape or dimensions of one or more regions or types of data included in the previous communications 118, the color or contrast associated with one or more regions or types of data, and so forth. As one specific example, FIG. 1 depicts three previous communications 118. Each of the previous communications 118 includes a first region for containing text, a second region for containing an image, and a third region for containing text. In each of the previous communications 118, the location of the first region, the second region, and the third region differ. The model 114 determined by the model generation module 116 includes an average location for each of the three regions. For example, each of the previous communications 118 includes a first region for containing text in an upper-left corner of the template 112. Therefore, the resulting model 114 includes the first region in the upper left corner of the template 112. Two of the three previous communications 118 include the second region in the center of the template 112, while a third previous communication 118 includes the second region positioned at the right edge thereof. Therefore, the resulting model 114 includes the second region positioned approximately one-third of the distance between the center and the right edge of the template 112. One of the previous communications 118 is shown including the third region in the lower left corner of the template 112, one of the previous communications 118 is shown including the third region in the lower right corner, and one of the previous communications 118 is shown including the third region in the bottom-center of the template 112. Therefore, the model 114 includes the third region positioned at the bottom-center of the template 112. In some implementations, one or more machine learning algorithms may be used to generate the model 114 based on the previous communications 118. For example, the effect of previous communications 118 on the resulting model 114 may be weighted based on the age of the previous communications 118, the position of various elements relative to a central location or another location within the template 112, the types of data included in the previous communications 118, and so forth.

In some implementations, the model generation module 116 may be configured to periodically or continuously modify the model 114 based on additional communications 102. For example, if the visual appearance of a communication 102 does not differ from that of the model 114 by at least a threshold tolerance, the communication 102 may be transmitted to a destination device, and the model 114 may be modified based on the visual appearance of the communication 102. As another example, if the visual appearance of a communication 102 differs from that of the model 114 by more than the threshold tolerance, but user input is received confirming that the communication 102 is not erroneous, the model 114 may be modified based on the visual appearance of the approved communication 102.

In some implementations, the model generation module 116 may be configured to use one or more machine learning techniques or neural networks to generate the model 114. For example, the model 114 may be defined by a set of weights or other parameters associated with a neural network rather than by coordinate locations of content.

A comparison module 120 associated with the communication server(s) 108 may determine correspondence between the visual appearance of at least a subset of the communications 102 and the visual appearance of the model 114. In some implementations, the comparison module 120 may render a communication 102 to generate an image file without outputting the communication 102. The comparison module 120 may determine the locations of one or more elements of the communication 102, the color, contrast, or shape of one or more elements, or combinations thereof. For example, the comparison module 120 may use one or more computer vision algorithms to determine coordinates corresponding to the locations of one or more regions, boundaries associated with types of content, separator lines, and so forth included in the communication 102. In some implementations, the comparison module 120 may be configured to use OCR techniques to determine the presence of absence of alphanumeric data, the presence or absence of a particular language, the presence or absence of particular content, and so forth. For example, the comparison module 120 may use OCR to determine that a region of the communication 102 includes English text rather than HTML code associated with the template that has been presented in the communication 102 as text rather than properly processed to affect the format of the communication 102.

In some implementations, the comparison module 120 may render the model 114 to generate an image file and use computer vision algorithms or similar techniques to determine the visual appearance associated with the model 114 and compare the visual appearance of the model 114 with that of the communication 102. In other implementations, the model 114 may be defined by coordinate locations or other data that may be compared to the visual appearance of the communication 102 without rendering the model 114. The comparison module 120 may be configured to determine one or more difference metrics or other types of values indicative of the extent of the differences between the visual appearance of the communication 102 and that of the model 114. If the difference metric is less than a threshold value indicated by threshold data 122, the comparison module 120 may generate a determination 124 indicating that the communication 102 is not erroneous. If the difference metric exceeds the threshold value, the comparison module 120 may generate a determination 124 indicating that the communication 102 is potentially erroneous. In some implementations, the determination 124 may indicate particular portions of the payload 106 or template 112 that may be associated with an error. For example, FIG. 1 depicts the communication 102 including text in the first region of the template 112 that extends beyond the boundary of the first region. Comparison of the communication 102 to the model 114 may indicate a difference in the location of the text within the template 112, the font of the text, the dimensions of the text, the location of the text relative to other visible elements of the template 112, and so forth. The determination 124 may indicate that the text or the corresponding region of the template 112 is erroneous.

A notification module 126 associated with the communication server(s) 108 may generate one or more notifications 128 based on the determination 124. For example, the notification module 126 may generate a notification 128 indicating that the communication 102 is potentially erroneous. In some implementations, the notification 128 may indicate that particular content, such as the text or region of the template 112 indicated in the determination 124, may include an error. The notification 128 may be provided to the user device 104. In some implementations, user input from the user device 104 may confirm that the communication 102 is erroneous or may approve the communication 102. As discussed previously, based on the user input, the model 114 may be modified based on the communication 102. In some implementations, in addition to or in place of the notification 128, the notification module 126 or another module associated with the communication server(s) 108 may prevent transmission of the communication 102 to a destination device.

Figure 2:
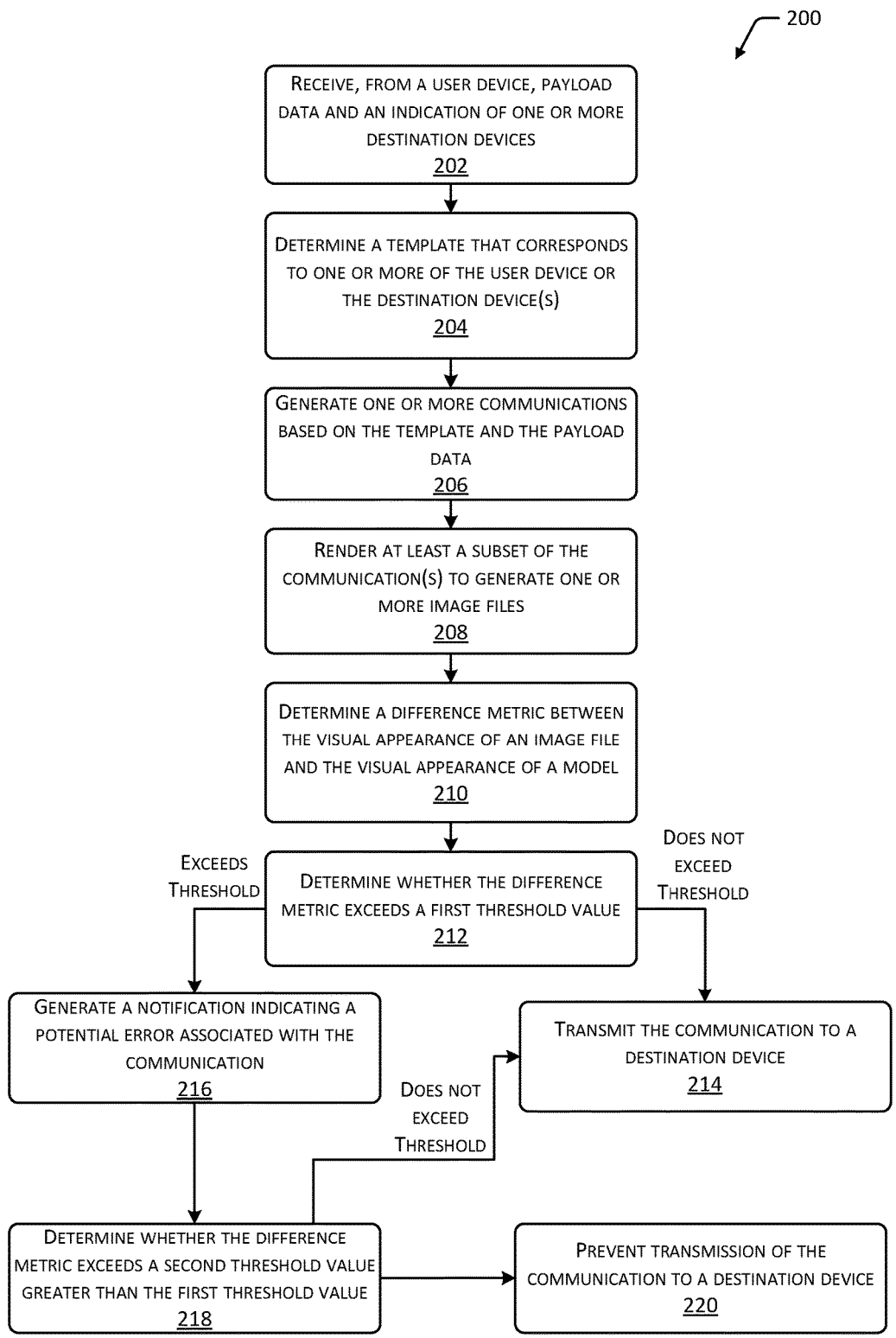
FIG. 2 is a flow diagram illustrating an implementation of a method for determining potential errors in communications and undertaking control actions responsive to potential errors.

FIG. 2 is a flow diagram 200 illustrating an implementation of a method for determining potential errors in communications 102 and undertaking control actions responsive to potential errors. At 202, one or more communication servers 108 or another type of computing device may receive, from a user device 104, payload data and an indication of one or more destination devices. As described with regard to FIG. 1, the payload data may include a payload 106 having one or more of alphanumeric data, image data, audio data, video data, or other types of data that may be output in one or more communications 102. The user device 104 may also indicate one or more destination devices that are to receive communications 102. In some implementations, the user device 104 may also provide an indication of one or more types associated with the communications 102, such as e-mail, SMS, or other types of push notifications.

At 204, a template 112 that corresponds to one or more of the user device 104 or the destination device(s) may be determined. For example, a first template 112 may be used to generate communications 102 using a payload 106 received from a first user device 104 while a second template 112 is used to generate communications 102 using a payload 106 received from a second user device 104. As another example, a first template 112 may be used to generate communications 102 provided to a first destination device or a first location, such as a particular country or other part of the world, while a second template 112 is used to generate communications 102 provided to a second destination device or location. In some implementations, different templates 112 may be used based on the medium used to generate communications 102. For example, a first template 112 may be used to generate e-mail communications 102 while a second template 112 is used to generate SMS communications 102.

At 206, one or more communications 102 may be generated based on the determined template 112 and the payload data. For example, a template 112 may include one or more regions for containing particular portions of the payload data. A template 112 may also include one or more visible elements associated with the template 112 itself, such as separator lines, images, headers, footers, text, borders and boundaries of regions, and so forth. A communication 102 may be generated by positioning portions of the payload data within corresponding regions of the template 112.

At 208, at least a subset of the communications 102 may be rendered to generate one or more image files. In some implementations, each generated communication 102 may be rendered. In other implementations, a fixed quantity of communications 102 may be rendered. In still other implementations, a percentage quantity of the communications 102 may be rendered. In some cases, the quantity of communications 102 that is rendered may be determined based on user input. For example, a user device 104 may provide user input indicating that twenty percent of the generated communications 102 are to be rendered to generate image files. Rendering of the communications 102 may include generating image files from which the visual appearance of a communication 102 may be determined, such as through use of computer vision algorithms, without necessarily outputting or displaying the communications 102.

At 210, a difference metric between the visual appearance of an image file and the visual appearance of a model 114 may be determined. As described with regard to FIG. 1, a model 114 may be generated based on one or more previous communications 118 associated with the template 112. For example, one or more machine learning algorithms may be used to generate the model 114 based on the visual appearances of the previous communications 118. In some implementations, the model 114 may be rendered to generate an image file from which the visual appearance of the model 114 may be determined. In other implementations, the model 114 may include data that may be compared with the visual appearance of the communication 102 without rendering the model 114. For example, the model 114 may include coordinate locations of particular visible elements of the template 112 or payload 106, and the coordinate locations of the model 114 may be compared with those of the communication 102 without rendering the model 114.

At 212, a determination may be made as to whether the difference metric between the model 114 and the visual appearance of the image file determined from the communication 102 exceeds a first threshold value. For example, as described with regard to FIG. 1, a comparison module 120 may compare the visual appearance of the model 114 with that of the communication 102 to determine a difference metric and may determine correspondence between the difference metric and threshold data 122. If the difference metric does not exceed the first threshold value, then at 214, the communication 102 may be transmitted to a destination device.

If the difference metric exceeds the first threshold value, then at 216, a notification 128 indicating a potential error associated with the communication 102 may be generated. In some implementations, the notification 128 may indicate one or more portions of the payload 106 data or of the template 112 associated with the potential error. In other implementations, if one or more modifications to the template 112 were recently received, the notification 128 may indicate one or more of the modifications as a potential source of error.

At 218, subsequent to generating the notification 128, a determination may be made as to whether the difference metric exceeds a second threshold value greater than the first threshold value. For example, if the difference metric is greater than the second threshold value, this may indicate that the error associated with the communication 102 may affect the visible appearance thereof in a manner that would mitigate the usefulness or understandability of the communication 102. If the difference metric does not exceed the second threshold value, then at 214, the communication 102 may be transmitted to a destination device subsequent to generating the notification 128. If the difference metric exceeds the second threshold value, then at 220, transmission of the communication 102 to the destination device may be prevented. In some implementations, the notification 128 may be generated subsequent to determining whether the difference metric exceeds the second threshold value, and the notification 128 may include an indication that transmission of the communication 102 was prevented.

Figure 3:
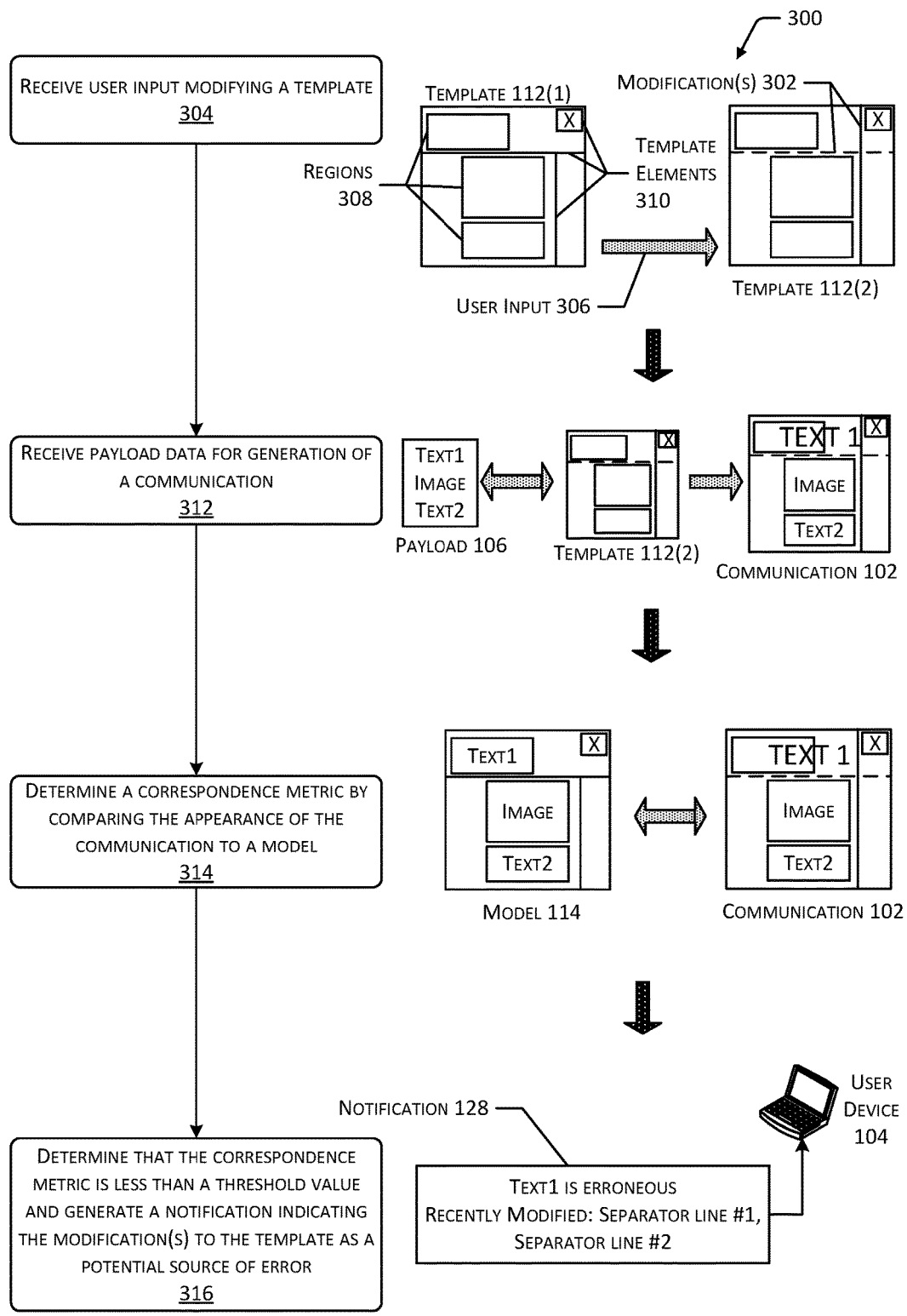
FIG. 3 depicts a scenario illustrating a method for determining modifications to a template as potential sources of error.

FIG. 3 depicts a scenario 300 illustrating a method for determining modifications 302 to a template 112 as potential sources of error. At 304, user input 306 modifying a template 112(1) may be received. For example, a template 112(1) may include multiple regions 308 for containing different types of payload data. Continuing the example, one or more regions 308 may be configured to contain alphanumeric data while other regions 308 may be configured to contain image data. The template 112(1) may also include one or more template elements 310, such as visible features that are present in the template 112(1) independent of the payload data. For example, template elements 310 may include borders, boundaries, separator lines, headers, footers, and so forth. In some cases, template elements 310 may include one or more of alphanumeric data, image data, or video data. For example, a template 112(1) may include alphanumeric data corresponding to a company name, a document title, or other visible elements that may be common to multiple communications 102. The user input 306 may be used to modify one or more of the regions 308 or template elements 310. For example, FIG. 3 depicts the modifications 302 including the extension of a first separator line, and the modification of a line style of a second separator line. Modification of the original template 112(1) may form a modified template 112(2).

At 312, payload data for generation of a communication 102 may be received. For example, the payload 106 may include one or more of alphanumeric data, image data, video data, and so forth to be inserted into the regions 308 of the modified template 112(2). The resulting communication 102 may include a portion of the payload 106 positioned within a corresponding region 308 of the template 112(2), as well as the modified template elements 310.

At 314, a correspondence metric may be determined by comparing the appearance of the communication 102 to a model 114. As described with regard to FIG. 1, correspondence between the model 114 and the communication 102 may be determined by rendering the communication 102 to generate an image file, then comparing the visual appearance of the image file with that of the model 114. In some implementations, the model 114 may also be rendered to generate an image file. In other implementations, the model may include data that may be compared with the visual appearance of the image file without rendering the model 114. The correspondence metric may include any manner of quantitative or qualitative indication of the similarity or difference between the visual appearance of the communication 102 and that of the model 114. For example, FIG. 3 depicts the communication 102 including text that extends beyond the border of one of the regions 308 of the template 112(2). Conversely, the corresponding text in the model 114 is contained within the region 308. As a result of this difference, the correspondence metric may be lower. In some cases, a modification 302 to a template 112 may cause one or more errors. For example, a user modifying the position or characteristics of a template element 310 or region 308 may inadvertently affect the manner in which payload data is positioned relative to the template element 310 or region 308. As another example, a user modifying a template 112 may inadvertently create erroneous code or modify existing code in an incorrect manner that causes an error.

At 316, the correspondence metric may be determined to be less than a threshold value, and a notification 128 indicating the modification(s) 302 to the template 112 as a potential source of error may be generated. For example, FIG. 3 depicts the notification 128 indicating that two template elements 310 were recently modified. In some implementations, the notification 128 may also indicate a specific portion of the payload 106 associated with an error or a specific region 308 of the template 112(2) associated with an error.

Figure 4:
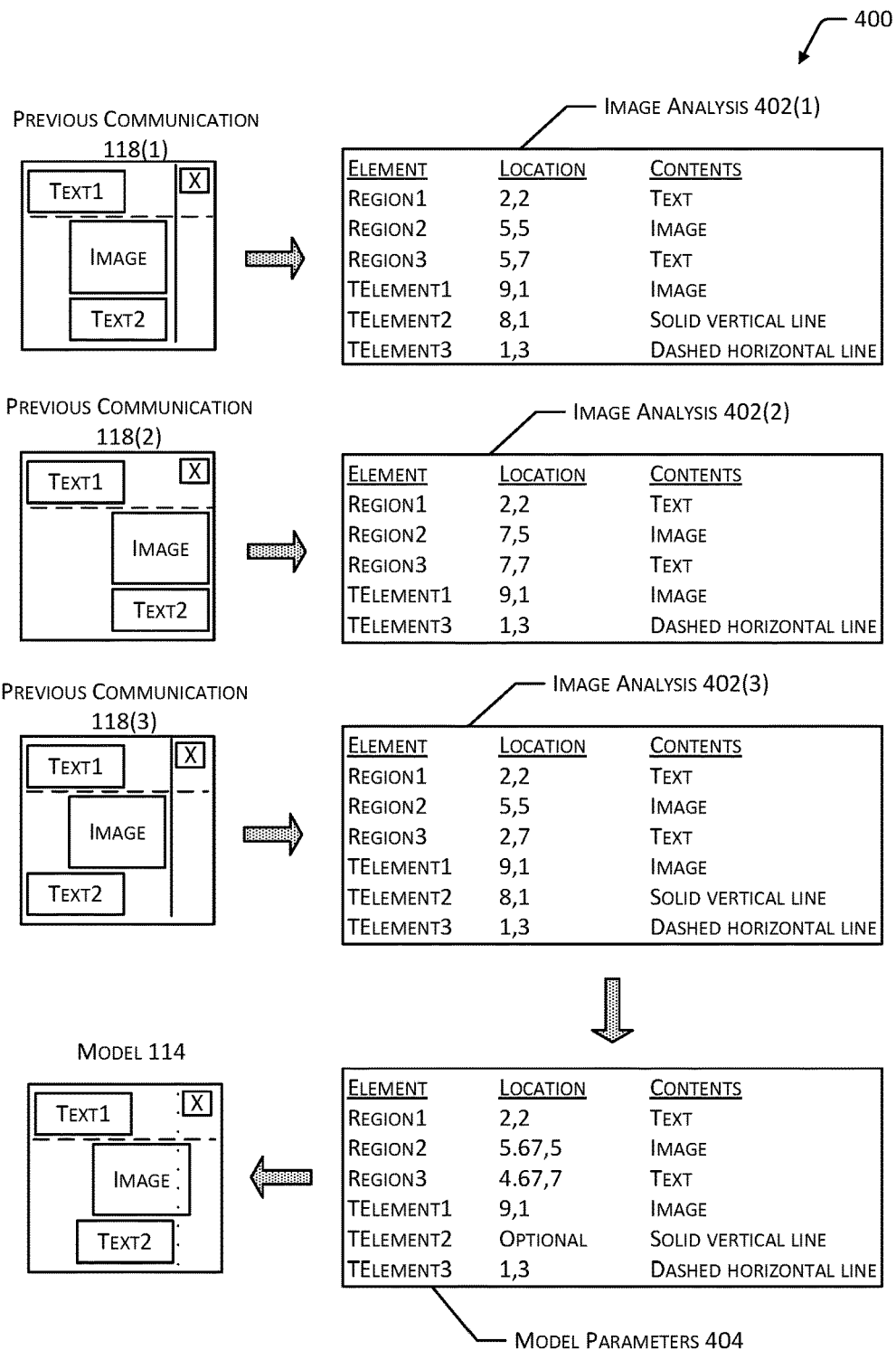
FIG. 4 is a diagram illustrating the analysis of previous communications to generate a model.

FIG. 4 is a diagram 400 illustrating the analysis of previous communications 118 to generate a model 114. As described with regard to FIG. 1, a model 114 for a template 112 may be generated based on previous communications 118 associated with the template 112. FIG. 4 depicts three example previous communications 118, each depicting different portions of a payload 106 within different regions 308 of a template 112, and different template elements 310. As described with regard to FIG. 1, a model generation module 116 may render each previous communication 118 to generate an image file and may perform image analysis 402 for each image file based on the visual appearance of the previous communications 118. For example, the model generation module 116 may use one or more computer vision algorithms to analyze the location, dimensions, color, contrast, and so forth associated with various portions of an image file. In one specific example, a Canny edge detection operator along with a Hough Transform technique may be used to determine the presence of straight edges, such as boundaries between sections of a template 112 or between types of content.

FIG. 4 depicts a first image analysis 402(1) associated with a first previous communication 118(1). The first image analysis 402(1) indicates locations associated with three regions 308 of the template 112 used to generate the previous communication 118(1) and the contents of each region 308. In some implementations, the first image analysis 402(1) may also indicate one or more of the color, shape, dimensions, or other characteristics of the regions 308. The first image analysis 402(1) also indicates locations associated with template elements 310 and the nature of the template elements 310. For example, two template elements 310 include lines extending across the template 112, while a third template element 310 includes an image in a corner thereof.

FIG. 4 depicts a second image analysis 402(2) associated with a second previous communication 118(2). The second image analysis 402(2) indicates locations associated with three regions 308 and two template elements 310 of the template 112. In comparison to the first image analysis 402(1), the second image analysis 402(2) indicates a first region 308 and a first template element 310 that are identical, a second template element 310 that is absent from the second previous communication 118(2), and two regions in the second previous communication 118(2) that are located closer to the right edge of the template 112 than the corresponding regions 308 of the first previous communication 118(1).

FIG. 4 depicts a third image analysis 402(3) associated with a third previous communication 118(3) that indicates two regions 308 and three template elements 310 in locations identical to those in the first previous communication 118(1). The third image analysis 402(3) also indicates one region 308 in which text is positioned closer to the left edge of the template 112 than the corresponding region 308 of the first previous communication 118(1) and second previous communication 118(2).

A model 114 may be generated based on the image analysis 402 for each previous communication 118. For example, model parameters 404 for the model 114 may be determined based on the image analyses 402 for each previous communication 118. Continuing the example, the model 114 may include regions 308 and template elements 310 positioned at an average location (e.g., a mean, mode, or median location), relative to the corresponding regions 308 and template elements 310 in the previous communications. As one specific example, FIG. 4 depicts the model 114 including a first region 308 and two template elements 310, which are common to each previous communication 118, in the same location as these elements are presented in the previous communication 118. FIG. 4 depicts the model 114 indicating a third template element 310 as an optional element, and two of the regions 308 positioned at locations between those of each of the previous communications 118. For example, FIG. 4 depicts two image analyses 402 in which the region 308 configured to contain image data is located at a first coordinate location (5,5), and one image analysis 402 in which the region 308 is located at a second coordinate location (7,5). The model 114, therefore, includes an indication of the region 308 between the depicted coordinate locations. For example, the location of the region 308 in the model 114 may be determined based on the average of the coordinates for each of the previous communications 118. Continuing the example, the model 114 is shown including the corresponding region 308 at a coordinate location (5.67,5) that is between the two coordinate locations of the previous communications 118. In some implementations, machine learning algorithms may be used to determine the manner in which each feature of each previous communication 118 is weighted to determine the model parameters 404. For example, older previous communications 118 may be weighted less than more recent previous communications 118. As another example, previous communications 118 that lack particular types of content may be weighted less than other previous communications 118.

Figure 5:
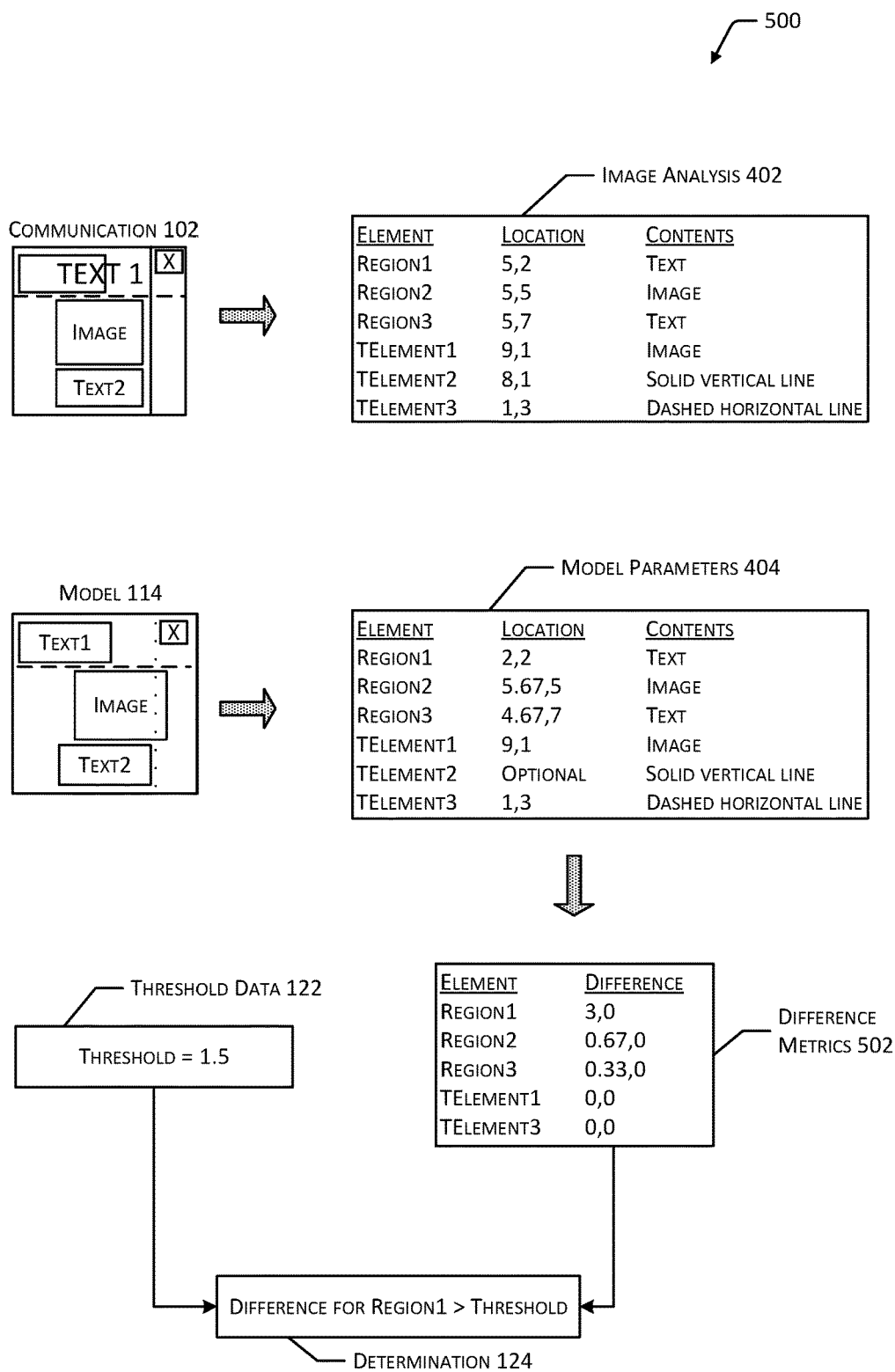
FIG. 5 is a diagram illustrating the comparison of a communication to a model to determine a difference metric.

FIG. 5 is a diagram 500 illustrating the comparison of a communication 102 to a model 114 to determine a difference metric 502. As described with regard to FIG. 1, a comparison module 120 may compare the visual appearance of a communication 102 with that of a model 114. The communication 102 may be rendered to generate an image file from which an image analysis 402 may be determined. The image analysis 402 may indicate one or more of the location, shape, dimensions, color, or contrast of one or more features of the communication 102, such as template regions 308, payload data within the regions 308, or template elements 310. The image analysis 402 associated with the communication 102 may be compared with the model parameters 404 associated with the model 114. In some implementations, the model 114 may be rendered to generate an image file, and the model parameters 404 may be determined based on the visual appearance of the image file. In other implementations, the model parameters 404 may be stored and compared with the image analysis 402 for the communication 102 without rendering the model 114.

One or more difference metrics 502 may be determined based on the differences between the locations, shapes, dimensions, colors, and contrasts of one or more portions of the communication 102 and corresponding portions of the model 114. For example, FIG. 5 depicts difference metrics 502 indicating a significant difference in the location of text corresponding to a first region 308 of the template 112, small differences in the location of two other regions 308 of the template 112, and no difference in the location of two template elements 312. A difference metric 502 may include a qualitative or quantitative indication of differences between the location, shape, dimensions, color, or contrast of corresponding portions of the communication 102 and model 114. For example, a difference metric 502 may include a distance measured using coordinate locations of corresponding portions of the communication 102 and the model 114. Continuing the example, FIG. 5 indicates the location of a first region 308 in the communication 102 with the coordinates 5,2 and the location of a corresponding region 308 of the model 114 with the coordinates 2,2, resulting in a difference metric 502 of 3,0.

A determination 124 may be generated based on correspondence between the difference metrics 502 and threshold data 122. For example, the threshold data 122 may indicate a threshold distance value of 1.5, which may be exceeded by the difference metric 502 of 3,0. In response to this difference metric 502, the determination 124 may cause the generation of a notification 128 associated with the communication 102.

Figure 6:
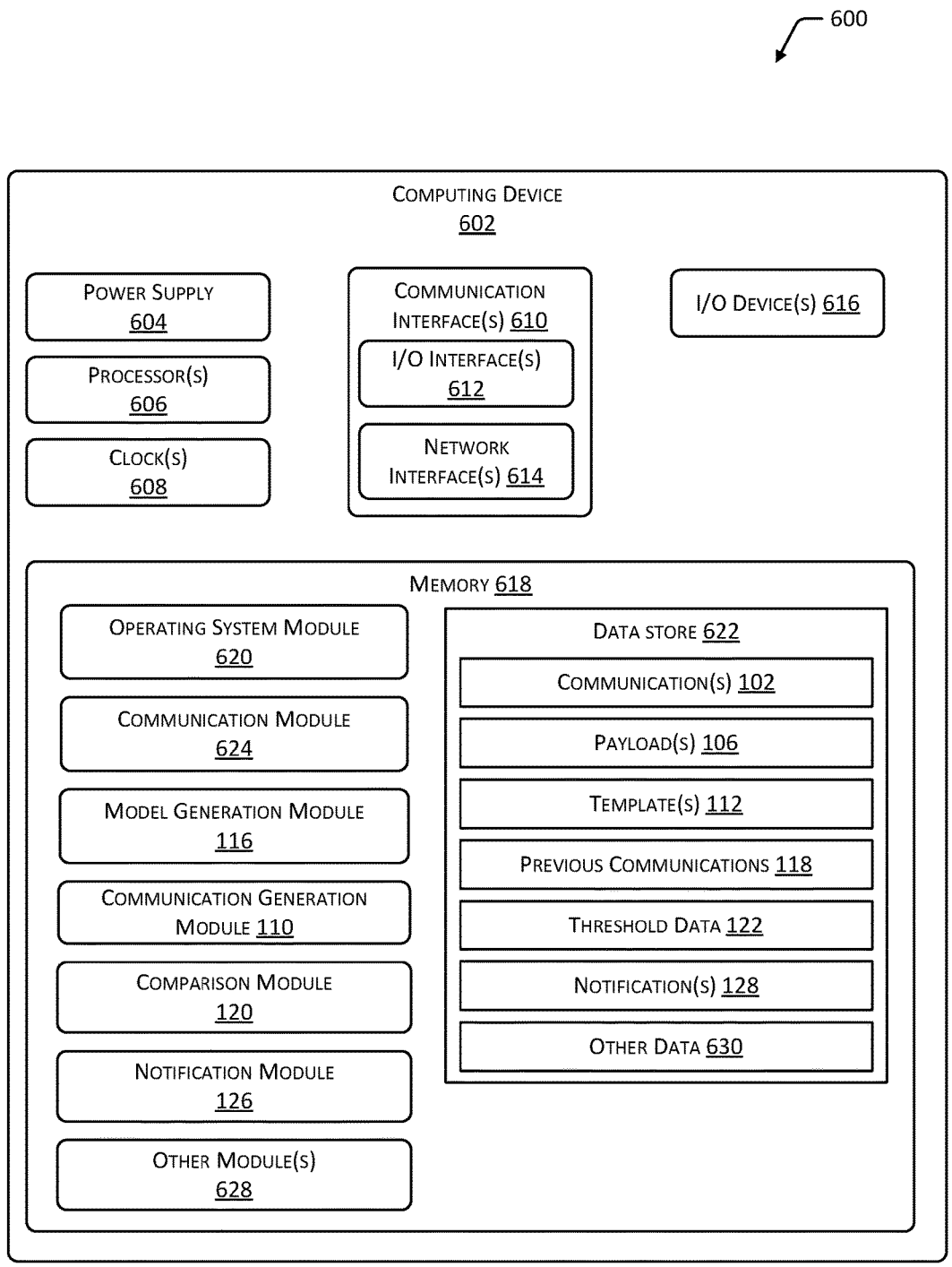
FIG. 6 is a block diagram illustrating a computing device within the present disclosure.

FIG. 6 is a block diagram illustrating a computing device within the present disclosure. The computing device 602 may include one or more communication servers 108, user devices 104, or any other type of computing device 602 in communication with one or more of the communication server(s) 108 or user device(s) 104. While FIG. 6 depicts a single computing device 602, in other implementations, the functions described with regard to the computing device 602 may be performed by any number and any type of computing devices 602. For example, a portion of the functions described herein may be performed by a user device 104 while other functions are performed by the communication server(s) 108. In other cases, all of the functions described herein may be performed by a single computing device 602 or a distributed group of computing devices 602.

One or more power supplies 604 may be configured to provide electrical power suitable for operating the computing device 602. In some implementations, the power supply 604 may include a rechargeable battery, fuel cell, photovoltaic cell, power conditioning circuitry, and so forth.

The computing device 602 may include one or more hardware processor(s) 606 (processors) configured to execute one or more stored instructions. The processor(s) 606 may include one or more cores. One or more clocks 608 may provide information indicative of date, time, ticks, and so forth. For example, the processor(s) 606 may use data from the clock 608 to generate a timestamp, trigger a preprogrammed action, and so forth.

The computing device 602 may include one or more communication interface(s) 610, such as input/output (I/O) interface(s) 612, network interface(s) 614, and so forth. The communication interfaces 610 may enable the computing device 602, or components of the computing device 602, to communicate with other computing devices 602 or components thereof. The I/O interface(s) 612 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 612 may couple to one or more I/O device(s) 616. The I/O devices 616 may include any manner of input device or output device associated with the computing device 602 or with another computing device 602 in communication therewith. For example, I/O devices 616 may include touch sensors, keyboards, mouse devices, microphones, image sensors (e.g., cameras 110), scanners, displays, speakers, haptic devices, printers, motion sensors, location sensors, and so forth. In some implementations, the I/O device(s) 616 may be physically incorporated with a computing device 602 or may be externally placed.

The network interface(s) 614 may be configured to provide communications between the computing device 602 and other devices, such as the I/O devices 616, routers, access points, and so forth. The network interface(s) 614 may include devices configured to couple to one or more networks, including local area networks (LANs), wireless LANs, wide area networks (WANs), wireless WANs, and so forth. For example, the network interfaces 614 may include computing devices 602 compatible with Ethernet, Wi-Fi, Wi-Fi Direct, Bluetooth, Bluetooth Low Energy, ZigBee, Z-Wave, 3G, 4G, LTE, and so forth.

The computing device 602 may include one or more busses or other internal communications hardware or software that allows for the transfer of data between the various modules and portions of the computing device 602.

As shown in FIG. 6, the computing device 602 may include one or more memories 618. The memory 618 may include one or more computer-readable storage media (CRSM). The CRSM may be any one or more of an electronic storage medium, a magnetic storage medium, an optical storage medium, a quantum storage medium, a mechanical computer storage medium, and so forth. The memory 618 may provide storage of computer-readable instructions, data structures, program modules, and other data for the operation of the computing device 602. A few example modules are shown stored in the memory 618, although the same functionality may alternatively be implemented in hardware, firmware, or as a system on a chip (SoC).

The memory 618 may include one or more operating system (OS) modules 620. The OS module 620 may be configured to manage hardware resource devices such as the I/O interfaces 612, the network interfaces 614, the I/O devices 616, and to provide various services to applications or modules executing on the processor(s) 606. The OS module 620 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

A data store 622 and one or more of the following modules may also be stored in the memory 618. The modules may be executed as foreground applications, background tasks, daemons, and so forth. The data store 622 may use a flat file, database, linked list, tree, executable code, script, or other data structure to store information. In some implementations, the data store 622 or a portion of the data store 622 may be distributed across one or more other devices including other computing devices 602, network attached storage devices, and so forth.

A communication module 624 stored in the memory 618 may be configured to establish communications with other computing devices 602.

The memory 618 may also store the model generation module 116. The model generation module 116 may generate a model 114 associated with a template 112 based on one or more previous communications 118 that were generated using the template 112. For example, the model generation module 116 may render previous communications 118 to generate image files then use computer vision algorithms to determine the visual appearance of the image files, such as the location, color, shape, dimensions, or contrast of various elements. The model 114 may be generated using machine learning algorithms or other techniques and may indicate the expected location, color, shape, dimensions, or contrast of elements. The model may be periodically or continuously updated as additional communications 102 are generated and transmitted.

The memory 618 may additionally store the communication generation module 110. The communication generation module 110 may receive a payload 106 from a computing device 602 and determine a template 112 that corresponds to one or more of the payload 106, the computing device 602, or a destination associated with the communication 102. In some implementations, the template 112 may be determined based on a language or geographical region associated with the communication 102, an application or other software used to generate or view the communication 102, and so forth.

The memory 618 may also store the comparison module 120. The comparison module 120 may render a generated communication 102 to generate an image file indicative of the visual appearance of the communication 102. The comparison module 120 may compare features of the visual appearance of the communication 102 with the visual appearance of the model 114 to determine a difference metric 502 indicative of differences between the communication 102 and the model 114.

The memory 618 may store the notification module 126, which may generate one or more notifications 128 associated with a communication 102. For example, the notification module 126, the comparison module 120, or another module may determine correspondence between the difference metric 502 and threshold data 122. If the difference between a communication 102 and the model 114 exceeds a threshold value, one or more notifications 128 may be generated indicative of a potential error in the communication 102. In some implementations, the notification(s) 128 may indicate specific elements of the communication or previous modifications to the template 112 that may be associated with an error.

Other modules 628 may also be present in the memory 618. For example, other modules 628 may include user interface modules for receiving user input 306, such as commands to control one or more configurations or settings, modifications to threshold data 122, or notification 128 preferences, and so forth. User input modules may also receive user input responsive to notifications 128. For example, the user input 306 may approve a communication 102 for transmission or prevent transmission of one or more communications 102. Other modules 628 may also include encryption modules to encrypt and decrypt communications between computing devices 602.

Other data 630 within the data store 622 may include default configurations and settings associated with computing devices 602, security data, such as encryption keys and schema, access credentials, and so forth.

In different implementations, different computing devices 602 may have different capabilities or capacities. For example, communication servers 108 may have significantly more processor 606 capability and memory 618 capacity compared to the processor 606 capability and memory 618 capacity of user devices 104.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
    generating a model based on one or more previous communications associated with a first template;

receiving a modification to the first template, wherein the modification is received after generating the model;

determining a second template based on the modification to the first template;

receiving payload data after determining the second template;

generating a communication that includes at least a portion of the payload data in one or more regions of the second template;

generating image data based on the communication, wherein the image data is indicative of a first visual appearance;

determining a correspondence metric based on correspondence between the first visual appearance of the communication and a second visual appearance of the model;

determining that the modification was received within a threshold amount of time;

based on the correspondence metric and in response to determining that the modification was received within a threshold amount of time, perform a control action associated with the communication, wherein the control action includes generating a notification indicating the modification to the first template as a potential source of error.

2. The method of claim 1, wherein determining the correspondence metric includes:

determining a first location of the at least a portion of the payload data in the first visual appearance;

determining a portion of the model that corresponds to the at least a portion of the payload data;

determining a second location of the portion of the model; and determining that the first location is within a threshold tolerance of the second location;

wherein the control action includes transmitting the communication to a destination device.

3. The method of claim 1, further comprising:

determining a difference metric between the first visual appearance and the second visual appearance, wherein the difference metric exceeds a first threshold tolerance;

wherein the control action further includes providing, in the notification, an indication of one or more of an error associated with the second template or an error associated with the payload data.

4. The method of claim 3, further comprising:

determining that the difference metric exceeds a second threshold tolerance greater than the first threshold tolerance;

wherein the control action further includes preventing transmission of the communication to a destination device.

5. The method of claim 1, further comprising:

generating the model by:

accessing a plurality of previous communications associated with the first template;

determining, for individual ones of the previous communications of the plurality of previous communications, respective visual appearances of the individual ones of the previous communications;

determining, for at least a subset of the respective visual appearances, respective locations of one or more types of data; and determining, based on at least a subset of the respective locations, an expected location associated with a type of data of the one or more types.

6. The method of claim 1, wherein the model includes a trained neural network.

7. The method of claim 1, further comprising:

receiving user input indicating that the modification will cause the first visual appearance to differ from the second visual appearance;

generating a modified model based on the communication; and replacing the model with the modified model.

8. The method of claim 1, further comprising:

determining one or more of a language or an application associated with the communication;

determining correspondence between a plurality of models and the one or more of the language or the application; and determining that the model corresponds to the one or more of the language or the application.

9. A system comprising:

one or more memories storing computer-executable instructions;

one or more hardware processors to execute the computer-executable instructions to:

access a plurality of communications associated with a first template;

generate image data indicative of respective visual appearances of at least a subset of the plurality of communications;

generate a model based in part on at least a subset of the respective visual appearances, wherein the model indicates at least one expected location for at least one type of content;

receive a modification to the first template, wherein the modification is received after generating the model;

determine a second template based on the modification to the first template;

receive first payload data after determining the second template;

generate a first communication based on the first payload data and the second template;

generate image data indicative of a visual appearance of the first communication;

determine correspondence between the model and the visual appearance of the first communication; and based on the correspondence and in response to determining that the modification was received within a threshold amount of time, perform a control action associated with the first communication, wherein the control action includes generating a notification indicating a modification to the first template as a potential source of error.

10. The system of claim 9, wherein the computer-executable instructions to determine the correspondence between the model and the visual appearance of the first communication include computer-executable instructions to:

determine, based on the visual appearance of the first communication, one or more locations corresponding to the at least one type of content;

determine a difference metric between the at least one expected location of the model and a first location of the one or more locations in the first communication; and determine correspondence between the difference metric and a threshold tolerance.

11. The system of claim 9, wherein the computer-executable instructions to generate the model include computer-executable instructions to:

determine, for individual communications of the at least a subset of the plurality of communications, a respective set of coordinates indicative of a location of a type of content; and determine the at least one expected location based on the respective sets of coordinates for the individual communications.

12. The system of claim 9, further comprising computer-executable instructions to:

determine, based on the visual appearance of the first communication, one or more locations corresponding to the at least one type of content;

determine, based on the correspondence, a difference metric between the one or more locations of the first communication and the at least one expected location of the model;

determine that the difference metric is less than a threshold tolerance;

transmit the first communication to a destination; and modify the at least one expected location based on the one or more locations of the first communication.

13. The system of claim 9, further comprising computer-executable instructions to:

receive user input indicating that the modification will cause the visual appearance of the first communication to differ from the visual appearance of the model;

generate a modified model based on the first communication; and replace the model with the modified model.

14. The system of claim 9, further comprising computer-executable instructions to:

determine, based on the correspondence, a difference metric between the first communication and the model; and determine that the difference metric exceeds a first threshold tolerance;

wherein the control action further includes generating a notification that indicates one or more of an error associated with the second template or an error associated with the first communication.

15. The system of claim 14, further comprising computer-executable instructions to:

determine that the difference metric exceeds a second threshold tolerance greater than the first threshold tolerance; and prevent transmission of the first communication to a destination.

16. The system of claim 15, further comprising computer-executable instructions to:

receive user input to cause transmission of the first communication to the destination; and in response to the user input, modify the model based on the first communication.

17. A system comprising:

one or more memories storing computer-executable instructions;

one or more hardware processors to execute the computer-executable instructions to:

access a plurality of communications associated with a first template, wherein the first template includes at least one region for outputting a type of data;

generate a plurality of image files indicative of a visual appearance of individual communications of the plurality of communications;

determine, for individual image files of the plurality of image files, a location of the type of data;

generate, based on the location of the type of data for at least a subset of the individual image files, a model that includes an expected location for the type of data;

receive first user input indicative of a modification to the first template, wherein the first user input is received after generating the model;

determine, based on the first user input, a second template;

receive payload data, wherein at least a portion of the payload data includes the type of data and the payload data is received after receiving the first user input;

generate a communication that includes the at least a portion of the payload data within at least one region of the second template;

produce an image file indicative of a visual appearance of the communication;

determine, based on the visual appearance of the communication and a visual appearance of the model, that a location of the at least a portion of the payload data differs from the expected location by at least a first threshold value;

determine that the first user input modified the first template within a threshold amount of time; and in response to determining that the first user input modified the first template within the threshold amount of time, generate a notification indicative of an error in one or more of the second template or the payload data, wherein the notification indicates the first user input indicative of the modification to the first template as a potential source of error.

18. The system of claim 17, further comprising computer-executable instructions to:

determine that the location of the at least a portion of the payload data differs from the expected location by less than a second threshold value, wherein the second threshold value is greater than the first threshold value; and in response to the location differing from the expected location by less than the second threshold value, transmit the communication to a destination device.

19. The system of claim 17, further comprising computer-executable instructions to:

receive second user input indicating that the modification to the first template will cause the visual appearance of the communication to differ from the visual appearance of the model;

wherein the indication of the modification as the potential source of error is included in the notification in response to the second user input.

20. The system of claim 17, further comprising computer-executable instructions to:

receive a response to the notification, wherein the response indicates approval of the communication;

transmit the communication to a destination device; and modify the expected location indicated in the model based on the location of the at least a portion of the payload data in the communication.

* * * * *